US012630428B2

(12) United States Patent
Zarabian et al.

(10) Patent No.: US 12,630,428 B2
(45) Date of Patent: May 19, 2026

(54) APPARATUS AND METHOD FOR PRODUCING CARBON NANOFIBERS FROM LIGHT HYDROCARBONS

(71) Applicant: CARBONOVA CORP., Calgary (CA)

(72) Inventors: Mina Zarabian, Calgary (CA); Pedro Pereira Almao, Calgary (CA)

(73) Assignee: CARBONOVA CORP., Calgary (CA)

( * ) Notice: Subject to any disclaimer, the term of this patent is extended or adjusted under 35 U.S.C. 154(b) by 841 days.

(21) Appl. No.: 17/426,049

(22) PCT Filed: Jan. 28, 2020

(86) PCT No.: PCT/CA2020/050097

§ 371 (c)(1),
(2) Date: Jul. 27, 2021

(87) PCT Pub. No.: WO2020/154799

PCT Pub. Date: Aug. 6, 2020

(65) Prior Publication Data

US 2022/0089442 A1 Mar. 24, 2022

Related U.S. Application Data

(60) Provisional application No. 62/797,801, filed on Jan. 28, 2019.

(51) Int. Cl.
*C01B 32/162* (2017.01)
*B01J 19/08* (2006.01)
(Continued)

(52) U.S. Cl.
CPC ........... *C01B 32/162* (2017.08); *B01J 19/087* (2013.01); *B01J 19/245* (2013.01);
(Continued)

(58) Field of Classification Search
None
See application file for complete search history.

(56) References Cited

U.S. PATENT DOCUMENTS

| | | | |
|---|---|---|---|
| 5,017,544 A | 5/1991 | Ikegami et al. | |
| 6,261,532 B1 | 7/2001 | Ono | |

(Continued)

FOREIGN PATENT DOCUMENTS

| | | |
|---|---|---|
| JP | S63158135 A | 7/1988 |
| JP | 2006-205037 A | 8/2006 |

(Continued)

OTHER PUBLICATIONS

Bernado et al., Membrane gas separation: A review/State of the Art, Ind. Eng. Chem. Res., 2009, 48 (Year: 2009).*

(Continued)

*Primary Examiner* — Keling Zhang
(74) *Attorney, Agent, or Firm* — NGUYEN TARBET IP LAW

(57) ABSTRACT

A process and apparatus for producing carbon nanofibers. The process comprises two stages. The first stage involves oxidizing light hydrocarbon with carbon dioxide or water, or oxygen, or a combination thereof to a mixture of hydrogen and carbon monoxide. The second stage involves converting the produced hydrogen and the carbon monoxide to carbon nanofibers and steam. In this way, greenhouse gases may be reduced by using carbon dioxide and methane (and/or other light hydrocarbons) as reactants; and useful products may be produced, such as Carbon NanoFibers (CNF).

24 Claims, 11 Drawing Sheets

(51) Int. Cl.

| | |
|---|---|
| *B01J 19/24* | (2006.01) |
| *B01J 21/04* | (2006.01) |
| *B01J 23/02* | (2006.01) |
| *B01J 23/06* | (2006.01) |
| *B01J 23/28* | (2006.01) |
| *B01J 23/34* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 35/40* | (2024.01) |
| *B01J 35/45* | (2024.01) |
| *B01J 35/50* | (2024.01) |
| *B01J 37/02* | (2006.01) |
| *B01J 37/08* | (2006.01) |
| *B01J 37/16* | (2006.01) |
| *C01B 3/38* | (2006.01) |

(52) U.S. Cl.
CPC .......... *B01J 19/2465* (2013.01); *B01J 21/04* (2013.01); *B01J 23/02* (2013.01); *B01J 23/06* (2013.01); *B01J 23/28* (2013.01); *B01J 23/34* (2013.01); *B01J 23/72* (2013.01); *B01J 23/745* (2013.01); *B01J 23/75* (2013.01); *B01J 23/755* (2013.01); *B01J 35/40* (2024.01); *B01J 35/45* (2024.01); *B01J 35/50* (2024.01); *B01J 37/0207* (2013.01); *B01J 37/08* (2013.01); *B01J 37/16* (2013.01); *C01B 3/38* (2013.01); *B01J 2235/00* (2024.01); *B01J 2235/15* (2024.01); *B01J 2235/30* (2024.01); *C01B 2202/08* (2013.01); *C01B 2203/0233* (2013.01); *C01B 2203/0405* (2013.01); *C01P 2002/72* (2013.01); *C01P 2002/82* (2013.01); *C01P 2004/03* (2013.01)

(56) References Cited

U.S. PATENT DOCUMENTS

| | | | |
|---|---|---|---|
| 6,919,062 | B1 * | 7/2005 | Vasileiadis ................ C01B 3/48 |
| | | | 423/652 |
| 7,618,612 | B2 | 11/2009 | Cortright et al. |
| 7,794,690 | B2 | 9/2010 | Abatzoglou et al. |
| 9,498,764 | B2 | 11/2016 | Nakamura et al. |
| 9,637,382 | B2 | 5/2017 | Noyes |
| 9,663,367 | B2 | 5/2017 | Koveal, Jr. et al. |
| 9,815,700 | B2 | 11/2017 | Sandu |
| 9,896,341 | B2 * | 2/2018 | Noyes .................... C01B 32/16 |
| 10,106,416 | B2 | 10/2018 | Noyes |
| 2008/0305028 | A1 | 12/2008 | McKeigue et al. |
| 2009/0013641 | A1 | 1/2009 | Li et al. |
| 2010/0007481 | A1 | 1/2010 | McKeigue et al. |
| 2012/0058296 | A1 | 3/2012 | Shah et al. |
| 2015/0006409 | A1 | 1/2015 | Zanetti |
| 2015/0086468 | A1 | 3/2015 | Noyes |
| 2019/0005512 | A1 | 1/2019 | Chowdhary et al. |
| 2019/0011911 | A1 | 1/2019 | Kubo et al. |

FOREIGN PATENT DOCUMENTS

| | | | |
|---|---|---|---|
| JP | 2007070166 | A | 3/2007 |
| JP | 5046078 | B2 | 10/2012 |
| JP | 5572874 | B2 | 8/2014 |
| WO | WO2006007760 | A1 | 1/2006 |
| WO | 2018023062 | A1 | 2/2018 |

OTHER PUBLICATIONS

Almeida et al., Fischer-Tropsch catalyst deposition on metallic structured supports, Natural Gas Conversion III, 2007 (Year: 2007).*

Park, C., Rodriquez, N. M., and Baker, R. T. K., "Carbon Deposition on Iron-Nickel during Interaction with Carbon Monoxide-Hydrogen Mixtures", Journal of Catalysis 169, 212-227 (1997).

Nikolaev, P. et al., "Gas-phase catalytic growth of single-walled carbon nanotubes from carbon monoxide", Chemical Physics Letters 313, 91-97 (1999).

Walker Jr, P. L., Rakszawski, J. F., and Imperial, G.R., "Carbon Formation from Carbon Nonoxide-Hydrogen Mixtures over Iron Catalysts. I. Properties of Carbon Formed", J. Phys. Chem., 63, 2, 133-140 (1959).

Tessonnier, J-P. et al., "Analysis of the structure and chemical properties of some commercial carbon nanostructures", Carbon, 47, 1779-1798 (2009).

Lima et al. "Structural features of La1-xCexNiO3 mixed oxides and performance for the dry reforming of methane." Applied Catalysis A: General 311 (2006): 94-104.

Kaydouh et al. "Effect of the order of Ni and Ce addition in SBA-15 on the activity in dry reforming of methane." Comptes Rendus. Chimie 18.3 (2015): 293-301.

Pietraszek et al. "The influence of the support modification over Ni-based catalysts for dry reforming of methane reaction." Catalysis Today 176.1 (2011): 267-271.

Jang et al. "Metal oxide (MgO, CaO, and La2O3) promoted Ni—Ce0. 8Zr0. 2O2 catalysts for H2 and CO production from two major greenhouse gases." Renewable energy 79 (2015): 91-95.

\* cited by examiner

| Element | App Conc. | Intensity Corrn. | Weight% | Weight% Sigma | Atomic% |
|---------|-----------|------------------|---------|---------------|---------|
| C K | 200.07 | 1.6303 | 85.56 | 0.57 | 92.44 |
| O K | 5.29 | 0.4809 | 7.66 | 0.49 | 6.22 |
| Al K | 1.34 | 1.0052 | 0.93 | 0.06 | 0.45 |
| Fe K | 3.34 | 0.7538 | 3.09 | 0.21 | 0.72 |
| Au M | 2.90 | 0.7351 | 2.75 | 0.30 | 0.18 |
| Totals | | | 100.00 | | |

Figure 11 b

| Carbon nanofibers | $I_D/I_G$ |
|---|---|
| From the proposed path in this work | 1.45-1.80 |
| Vapor grown CNF-PS-pyrograf-700 C | 3.60 |
| Vapor grown CNF-pyrograf-LHT-1500 C | 1 |

APPARATUS AND METHOD FOR PRODUCING CARBON NANOFIBERS FROM LIGHT HYDROCARBONS

FIELD OF THE INVENTION

This disclosure relates to processes for large scale selective manufacturing of carbon nanofibers (CNF). In particular, this disclosure relates to generating CNF from selective combination of catalytic reactions started with a stream comprising methane and an oxidizing agent to produce syngas with an appropriate $H_2/CO$ ratio and sequentially generating carbon nanofibers on a specific topographic surface and/or enhancement of CNF alignments by generating a magnetic field.

BACKGROUND OF THE INVENTION

A greenhouse gas (GHG) is a gas that absorbs and emits radiant energy within the thermal infrared range. Greenhouse gases cause the greenhouse effect. The primary greenhouse gases in Earth's atmosphere include carbon dioxide and methane.

The Canadian Government estimates that as a greenhouse gas, methane has a global warming potential more than 70 times greater than carbon dioxide ($CO_2$) over a 20-year period.

Natural gas is a naturally occurring hydrocarbon largely containing methane. Direct combustion of methane or reforming it to higher value products are two general ways of extracting energy from methane.

Catalytic reforming is a generally known process to convert methane into syngas. Syngas is a mixture of hydrogen and carbon monoxide with different ratio is a valuable building block for many downstream products such as methanol, dimethyl ether, and liquid fuel via Fischer-Tropsch process.

In most downstream production, syngas with high $H_2/CO$ ratio is preferred. For example, the appropriate ratio of $H_2$ to CO ratio for methanol production is 2 and for the purpose of hydrogen production from steam reforming is above 3.

Catalytic decomposition of carbon monoxide with or without $H_2$ to produce various carbon products on Fe and Fe—Ni based catalyst was investigated by many previous arts either as a nuisance phenomenon in metal dusting or advantageous phenomenon in synthesizing filamentous carbon (ref 1-3—see bibliography at end of description). $H_2$ was known to keep the catalyst in a reduced state and increases the process efficiency.

Controlling the carbon crystallinity, size and distribution are critically affected by the catalyst and process parameters. Catalyst composition, size, and distribution, carbon containing gas, C:H:O ratio in the reactants, temperature, pressure, and space velocity are among the recognized parameters. In most cases, the catalytic decomposition process resulted in a combination of different carbon allotropes. Formation of different carbon allotropes such as carbon shells, carbon anions, carbon spheres or disordered carbon cause an encapsulation and poisoning of the catalyst and consequently low efficiency of the process.

Carbon nanofibers (CNF) with solid or hollow core may have a diameter in the range of 5-100 nm, it's length may vary from 1 μm to a few mm. CNF have advantageous properties which make them very valuable materials for many industrial applications such as energy storage and reinforced plastics. The only known reaction that simultaneously utilize both greenhouse gases, methane and $CO_2$, is known as dry reforming of methane discovered in 1928 by Fischer-Tropsch. This reaction has not been industrially well exploited due to highly endothermic nature, low proportion of $H_2$ to CO for fuel and chemicals productions, and lack of industrially viable catalysts that withstand the severe reaction conditions.

Dry reforming of methane with an equal mole of the reactants (Carbon dioxide and methane) results in low $H_2/CO$ ratio close to 1 or slightly below 1 due to concurrent reverse water gas shift reaction.

As is known, the inherent difficulty of using $CO_2$ derives from the high stability of the $CO_2$ molecule, which makes it difficult to convert to other forms of carbon. $CO_2$ is the most oxidized type of carbon, has a symmetrical molecule structure and has a low enthalpy of formation ($\Delta H_{298\ K}=-393.53$ $kJ \cdot mol^{-1}$). This makes decomposition or conversion of $CO_2$ to other compounds a highly energy demanding process with the result being that processes used to convert $CO_2$ to other products (i.e. a $CO_2$ conversion process) may produce more $CO_2$ globally as a result of the energy used to power the process (e.g. if the energy is generated at a hydrocarbon-based power plant). This results in an overall increase of the carbon footprint, instead of the intended abatement.

Current trends of $CO_2$ utilization focus on the production of fuels, chemicals, $CO_2$-release retardant solids, and low value mixture of different allotropes of solid carbon products. However, there are presently a relatively limited number of processes to produce low cost and economically useful products derived from carbon dioxide.

SUMMARY OF THE INVENTION

In accordance with the invention, there is provided a process for producing nanofibers comprising:

in a first reactor, oxidizing a light hydrocarbon stream using an oxidizing agent, to produce an intermediate gas stream comprising hydrogen and carbon monoxide with an appropriate ratio; and in a subsequent second reactor, converting the produced hydrogen and the carbon monoxide selectively to carbon nanofibers that build up inside the second reactor, and steam which exits the second reactor.

The process may be configured to produce carbon nanofibers on a large scale, greater than 0.5 kg per day.

The process may be configured to produce high-purity carbon nanofibers.

The first reactor may be configured to enable dry catalytic reforming of the hydrocarbon with an appropriate $H_2:CO$ ratio. The catalyst and process condition in the first reactor may be configured to minimize water formation through Bosch reaction and eliminates the water condensation and heat loss of the intermediate gas stream before entering into the second reactor.

The first reactor may be configured to enable steam catalytic reforming, dry catalytic reforming, partial oxidation of the hydrocarbon or the combination thereof to produce appropriate ratio of hydrogen to carbon monoxide. In this context, extra hydrogen contents in the intermediate gas stream may be adjusted by a membrane and produce the separate stream of hydrogen as a fuel. In this context, dry reforming may mean that the ratio of water to carbon dioxide entering the first reactor is less than 5% by volume, steam reforming may mean the ratio of water is at least 10%.

The process may comprise separating, using a separator, the unreacted portions of $CO_2$, water and the light hydrocarbon from the intermediate gas stream; and recycling the separated unreacted portions of $CO_2$, water and the light hydrocarbon into the first reactor.

The step of separating the unreacted portions of $CO_2$ and the hydrocarbon from the converted gas stream from the first reactor may be carried out using a membrane separator.

The process may comprise recycling any non-aqueous components exiting the second reactor to the separator.

The process of conversion in the first reactor may be carried out at a temperature between about 480° C. and about 850° C.

The process of conversion the first reactor may be carried at a pressure up to about 5 MPa.

The hydrocarbon may be methane.

The process may comprise an integration of an endothermic reaction (first reactor) and an exothermic reaction (second reactor) and thus harvesting heat from the second reactor and supplying the harvested heat to the first reactor.

The process may comprise condensing the produced steam from the second reactor into liquid water.

According to a further aspect, there is provided an apparatus for the production of carbon nanofibers comprising:
a first reactor, the first reactor configured to receive a light hydrocarbon stream and an oxidizing agent carbon dioxide, steam, oxygen or a combination thereof stream and to subject the received light hydrocarbon and oxidizing stream to a process of catalytic conversion to produce an intermediate gas stream comprising hydrogen and carbon monoxide; and
a second reactor, the second reactor configured to converting the produced hydrogen and the carbon monoxide to carbon nanofibers that build up on support surfaces inside the second reactor, and steam which exits the second reactor.

The second reactor may comprise a support structure abundantly populated with catalytic nanoparticles (nP). The spacing between neighbouring nanoparticles may be on the same order of magnitude as the diameter of the nanoparticles. That is, the average closest approach between neighbouring nanoparticles may be between 0.1-10 times the average diameter of the nanoparticles.

The substrate maintains the catalyst in the path of reactants well exposed as well as allowing the gas stream flowing with minimum pressure drop (below 50 psi). In some embodiments, the support may formed as a sheet, as a folded sheet, as a cylinder or coaxial cylinders or rolled foils or mesh coaxially positioned in the reactor. The support surface may composed a non-active layer towards carbon formation which holds the active nanoparticles such as Fe, Ni, Mg, Cr, Cu, Zn, Mo, Co, and Mn well distributed. The non-active layer is generally composed of oxide materials such as alumina, chromia, zirconia, silica, or a combination thereof. In some embodiments, this non active layer is composed of alumina and zirconia whiskers which are textured in 3D, and forming an uneven surface. The terracing feature is providing a physical barrier between nanoparticles (nPs), separating active metals and preventing them from sintering and grain growth during heat treatment and reaction. Carbon nanofibers grow on active sites containing nanoparticles of the metals Fe, Ni, Mg, Cr, Cu, Zn, Mo, Co, and Mn and combinations thereof.

Alumina whiskers act like a cage and ensures the deposition of active metals well distributed, it avoids them to move and sinter at high temperature (Tamman temperature). Alumina whiskers may be in the form of plates with at least one extended dimension between 0.5-10 μm and at least one thickness dimension between 10-500 nm. These whiskers form cages of less than around 0.2-10 μm which restricts the movement of the deposited nanoparticles of catalyst across the bulk surface.

The Tamman Temperature: (for bulk diffusion) may be considered to be the temperature at which the atoms or molecules of the solid acquired sufficient energy for their bulk mobility to become appreciable (e.g. to allow sintering). The Tamman temperature is typically around one-half of melting point in Kelvin. The surface-diffusion temperature may be considered to be the temperature at which the atoms or molecules can migrate on a surface.

Active metal terracing also keeps CNF individually separated and allowing them to elongate with supressed tangling effects. In some embodiments, the nano particle size varies below 10 nm or below 20 nm, below 35 nm or below 50 nm. In some embodiments, the nanoparticles are below 100 nm.

The second reactor may comprise a magnetic field generator configured to orientate the carbon nanofibers. The nanoparticles may contain magnetic materials, such as Fe, Ni, and Co, which may be aligned in the magnetic field.

At least a portion of the support may be positioned on the inner surface of the second reactor. In some embodiments, the reactor inner surface may be prepared to fulfill the function of the support and the nanoparticles may sit directly on the surface of the reactor.

The apparatus may comprise a separator configured to:
receive the intermediate gas stream and separate the intermediate gas stream into hydrogen and carbon monoxide intermediates and $CO_2$ (and possibly water) and hydrocarbon reactants; and
transmit the separated intermediates to the second reactor; and
recycle the reactants to the first reactor.

The apparatus may comprise a drier configured to:
condense the produced steam from the second reactor, to separate the water component from any remaining reactants or intermediates; and
recycle any remaining reactants or intermediates to the separator.

The second reactor may comprise a support structure that is a corrugated support surfaces in a macroscopic scale, this will provide excess surface to load nanoparticles of catalyst or catalyst precursor and provide path for increased exposure of the nanoparticles to the reactants (see FIG. 2A).

The support may be magnetized.

The second reactor may comprise a magnetic field generator configured to control the orientation of the carbon nanofibers.

The second reactor may comprise a group of alternating cartridges, which are assembled in 2D matrix array or 3D matrix array. In some embodiments, the cartridges are located in series, in parallel or a combination thereof to maximize CNF formation in a semi continuous flow process.

According to a further aspect, there is provided a catalyst for the conversion of hydrogen and carbon monoxide into carbon nanofibers and water, the catalyst comprising:
nanoparticles of or comprising one or more of Fe, Ni, Cu, Zn, Co, Mg, Mn, Cr, K, Ca, Ti, Na and Mo mounted on a support.

The support may comprise a series of barriers, the barriers being configured to restrict motion of the nanoparticles across a surface of the support. The average distance between opposing barriers may be commensurate with (e.g. between 0.5 and 5 times) the average diameter of the catalyst nanoparticles. The barriers may be protrusions from and/or trenches in the support surface.

The barriers may be filamentous oxide whiskers. The whiskers may comprise alumina. The whiskers may comprise zirconia.

The catalyst may be mounted on a support, the support comprising oxide whiskers and ridges grown on a metallic substrate, such as filamentous alumina whiskers, chromia, zirconia. yttria. or a combination thereof.

The support may comprise an iron-aluminum alloy.

The support may comprise 5% aluminium by weight (or otherwise, less than 10-20% aluminium by weight).

The support may comprise iron-aluminium (e.g. FeCrAl) alloy. The alloy may comprise at least 1% aluminium by number.

Using FeCrAl may be advantageous for a number of reasons. The support may be heat treated to form the alumina whiskers which can be used to restrict the motion of the deposited nanoparticles. This may allow the catalyst to selectively produce nano fibers because the size and distribution of the catalyst nanoparticles are controlled. The support is also metallic which may allow the support to be bent into shape (e.g. into corrugations to increase the surface area). The support may also be heat conducting. This may be important for its use in conjunction with a exothermic reaction. That is, heat can be distributed to prevent hot-spots from forming, and to allow heat to be harvested from the second reactor (in order to be provided to the first). The support may be magnetic to facilitate loading nPs (providing a physical bond before heat treatment and formation of a chemical bond).

The support may be corrugated or roughened to increase the surface area.

According to a further aspect, there is provided a process of creating a catalyst for the conversion of hydrogen and carbon monoxide into carbon nanofibers and water, the method comprising:

heat treating an aluminum containing iron alloy to enable migration of Al or Zr or Cr, or Y or a combination thereof to the surface, oxidize these elements and formation of oxide whiskers such as $Al_2O_3/ZrO_2$ on the surface and make a support with a texturized surface;

impregnating the support surface with nanoparticles of transition metal oxides (and/or depositing the nanoparticles on the support surface) comprising at least one of Fe, Ni, Cu, Zn, Co, Mg, Mn, Cr, K, Ca, Ti, Na and Mo. The method may comprise reducing the nanoparticles of transition metal oxides, for example, to produce metallic nanoparticles. In some embodiments, instead of metal oxide, metal particles may be deposited on the surface. In some embodiments, the catalyst material such as nitrates, chloride, oxalate, sulfite, sulfate, carbonate, acetate, or citrate containing above mentioned metals may be deposited. The heat treatment may be performed at a temperature between 500-700 or 700-1000° C. for 5-48 hours.

The process may comprise:

depositing a catalyst precursor on the support, and heat treating and reducing the catalyst precursor with CO, $H_2$, or combinations of them diluted with an inert gas, Ar, He, and $N_2$ at a temperature between 500-800° C. for 2 to 48 hours. In some embodiments, the heat treating may be performed only in an inert atmosphere.

According to a further aspect, there is provided a process of creating a catalyst for the conversion of hydrogen and carbon monoxide into carbon nanofibers and water, the method comprising:

heat treating an iron-aluminum alloy to enable formation of $Al_2O_3$ whiskers on the surface and make a support surface;

impregnating the support surface with nanoparticles of transition metal oxides comprising at least one of Fe, Ni, Cu, Zn, Co, Mg, Mn and Mo; and reducing the nanoparticles of transition metal oxides.

The heat treatment may take place in the presence of oxygen (e.g. air).

The process may form other compounds which form barriers on the surface. These compounds may comprise aluminium.

The reducing step may comprise a heat treatment performed at a temperature between 500-1000° C. for 5-48 hours. In some embodiments, the reducing step maybe eliminated.

The diameter of the nanoparticles may be between 10-150 nm.

The support may comprise a rough surface for supporting the nanoparticles.

The process may comprise:

depositing a catalyst precursor on the support, heat treating and reducing the catalyst precursor with CO, $H_2$, or combinations of them diluted with an inert gas, Ar, He, and $N_2$ at a temperature between 500-800° C. for 2 to 48 hours.

According to a further aspect, there is provided a process of converting hydrogen and carbon monoxide into carbon nanofibers and water using a catalyst of nanoparticles comprising one or more of Fe, Ni, Cu, Zn, Co, Mg, Mn and Mo, the nanoparticles being mounted on a support, the method comprising: passing hydrogen and carbon monoxide over the catalyst to produce carbon nanofibers.

The ratio of hydrogen to carbon monoxide (e.g. produced by the first reactor and/or entering the second reactor) may be between 0.5 and 1.2. The ratio of hydrogen to carbon monoxide may be between 0.3 and 1.2.

The support may comprise a metallic substrate.

The support may comprise barriers which restrict the migration of nanoparticles across the support surface.

The barriers may be alumina whiskers.

The process may be configured to use pulsed or swing stream of oxidizing agent ($CO_2$, $O_2$, or steam) and hydrocarbon. In some embodiment, the oxidizing agent may be $CO_2$, steam or a combination thereof. In some embodiments, light hydrocarbon may react with readily adsorbed $CO_2$ on a surface of adsorbents.

Carbon dioxide and light hydrocarbon may be obtained as feed for the first reactor from landfill and biomass or fossil fuel resources containing 20-80% $CO_2$.

Heat of combustion of hydrocarbon may be utilized to provide the heat needed in the first reactor.

The reaction to form carbon nanofibers may be considered selective if more than 60% of the carbon formed by mass is in the form of carbon nanofibers (e.g. rather than graphite or amorphous carbon.)

BRIEF DESCRIPTION OF THE DRAWINGS

The invention is described with reference to the drawings in which:

FIG. 2a shows a schematic formation of $Al_2O_3$ whiskers.

FIG. 2b is an image of the substrate and $Al_2O_3$ whiskers after heat treating in air at 900° C. for 22 hr.

FIG. 11b is the Id/Ig range comparison with the commercially available carbon nanofibers from Pyrograf based on reference 4.

DESCRIPTION OF THE INVENTION

Overview

As described above, carbon dioxide and methane with high global warming impacts has limited use as a feedstock due to the difficulty in converting the stable carbon dioxide molecule and symmetrical methane molecule into other forms of carbon. The inventors have realised that certain forms of pure carbon may be a viable target product to produce from reforming light hydrocarbon such as methane and an oxidizing agent such as carbon dioxide, steam, oxygen, or a combination thereof. One area having high demand and a multitude of uses is the nano-materials industry. In particular, carbon derived nano-materials could provide an effective means of utilizing industrial quantities of $CO_2$ and hence provide an effective means of atmospheric carbon sequestration.

That is, the method described below can be used to:

Reduce greenhouse gases by using carbon dioxide and methane (and other light hydrocarbons) as reactants. $CH_4$ is 30 times more potent than $CO_2$ in global warming impact and this proposed path simultaneously converts both greenhouse gases (GHG).

Produce useful products, in particular, Carbon Nano-Fibres (CNF).

There is an increasing attention to utilize CNF for transportation vehicles and other large-scale applications. This will result in lighter vehicles, and higher fuel efficiency, which consequently contributes to lowering $CO_2$ emissions. In particular, CNF is mixed with polymer to prepare carbon nanofiber reinforced polymer (CNFRP), CNFRP can be moulded or printed into the desired component shape. CNFRP have wide usages in aerospace, sport equipment, wind turbine, pressure vessel and etc.

System

Figure 1:
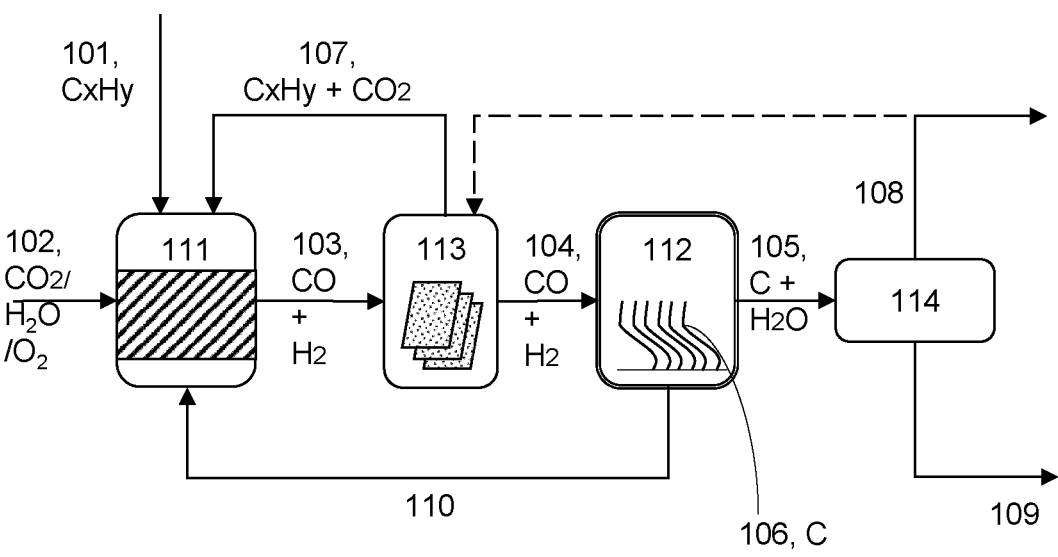
FIG. 1 is a schematic diagram of an embodiment of a system for converting light hydrocarbons and oxidizing agent (such as carbon dioxide, steam or O2) into water and carbon nanofibers.

The schematic diagram of the coupled process is shown in FIG. 1. Oxidizing stream containing Carbon dioxide or steam or a combination of them 102 is reacted with a light hydrocarbon 101 (C1-C4) in a series of processing vessels 111-114 under conditions to promote the formation of highly selective solid carbon nanofibers 106 and water 109.

First reactor 111 is configured to convert oxidizing stream (for example $CO_2$, steam, oxygen or a combination thereof) 102 and light hydrocarbons 101 (e.g. C1 to C4) to produce an intermediate stream 103 comprising CO and $H_2$ (e.g. in the volume proportion close to 1:1). The intermediate stream 103 may also include unreacted portions of the reactants ($CO_2$, steam and/or unreacted light hydrocarbons). This first reactor contains a catalyst designed to facilitate the reaction. The first reactor, the reaction conditions and the reactant chemicals, and the reactant proportions may be controlled in order to: adjust the $CO:H_2$ and/or reduce the water content exiting the first reactor. This may allow the output stream of the first reactor to be directly used in the second reactor without further processing.

Second reactor 112 is configured to convert CO and $H_2$ 105 (e.g. in the volume proportion 1:1) into solid carbon nanofibers 106, which are configured to grow within the second reactor 112 until reaching desired length of fiber, at which point they can be mechanically extracted via a wide variety of methods. This second reaction zone contains a catalyst designed to facilitate the reaction. Because CO and $H_2$ are relatively reactive materials, the second reactor may be insensitive to the presence of other materials being present (e.g. unreacted $CO_2$ and/or $CH_4$ from the first reactor). The second reactor 122 may be configured to have an alternative entrance and exit or multi point entrance. The second reactor 122 may, in other embodiments, may be configured to operate independently of the first reactor (e.g. with an alternative source of CO and $H_2$).

Separator 113 is a separator having, for example, membranes to separate and recycle unreacted $CO_2$ and the light hydrocarbons 107 back to the first reactor 111. Using such a separator may increasing the global yield of CO and $H_2$, therefore enriching the content of CO and $H_2$ flowing toward the second reactor 112. Separator 113 may not be present in some embodiments. That is, the products of the first reaction (and any remaining reactants) may be injected directly into the second reactor.

Dryer 114 may comprise a water condensation or adsorption trap and is configured to dry out the unreacted stream of CO and $H_2$ that may also contain important proportions of unreacted $CO_2$ and light hydrocarbons from the first reactor 111. Dryer 114 allows $CO_2$ and the light hydrocarbon to be recycled to reaction zone 111 and CO and $H_2$ to the reaction zone 112 to increase the global yield of CNF. It also provides for exhaust of the unreacted dried gas stream from the global process for any further use. Dryer 114 may not be present in some embodiments.

$CO_2$ rich stream 102 (e.g. of industrial origin) is introduced into first reactor 111. The $CO_2$ rich stream 102 typically has a volume content of $CO_2$ higher than 90% v, most commonly higher than 95% v.

$CH_4$ or light-hydrocarbon-rich stream 101 comprises hydrocarbons with levels of volume content of $CH_4$ or light hydrocarbons typically higher than 90% v, most commonly higher than 95% v with traces of inorganic gases.

$CO_2$ rich stream 102 and $CH_4$ or light-hydrocarbon-rich stream 101 are combined in reactor 111 to generate an unseparated intermediate $CO/H_2$ stream 103. It will be appreciated that this $CO/H_2$ stream 103 may include a proportion of unreacted $CO_2$, $CH_4$, steam or light-hydrocarbons.

In this case, the unseparated intermediate $CO/H_2$ stream 103 is introduced into separator 113 to separate the unreacted reactants ($CO_2$, $CH_4$, light-hydrocarbons, steam) from the intermediates (the products of the first reaction, CO and $H_2$). The unreacted reactants 107 ($CO_2$, $CH_4$, light-hydrocarbons) are recycled into the first reaction chamber 111 for another pass through the first reaction chamber 111.

The separated intermediate $CO/H_2$ stream 104 is then passed into the second reactor vessel 112. This reactor vessel is configured to convert the carbon monoxide and hydrogen into carbon and water. The carbon grows within the chamber as carbon nanofibers 106, whereas the water is retained in the gaseous fluid flow.

As discussed further below, in this case, the second reactor vessel comprises catalysts mounted on corrugated supports to facilitate the growth of the carbon nanofibers 106.

The gaseous fluid flow 105 from second reactor vessel 112 is passed to dryer 114 for drying. This produces a liquid water stream 109 from the water produced at reaction zone 112 and condensed or adsorbed at the separation zone 114.

The dryer 114 also produces a recycle or exhaust stream 108 containing unreacted reactants from reaction zone 112 (CO and $H_2$) and/or from reaction zone 111 ($CO_2$ and light hydrocarbons). This stream may be returned to the separator 113 for processing. The separator 113 will return the unreacted CO and $H_2$ from second reaction zone 112 to second reaction zone 112; and the unreacted $CO_2$ and light hydrocarbons from first reaction zone 111 to first reaction zone 111.

As will be discussed further below, heat 110 produced in the second reaction zone 112 is recovered and injected to the first reaction zone 111.

Chemical Reactions

Regarding the chemical reactions, this apparatus of configured to catalytically convert $CO_2$ (Carbon Dioxide) and light hydrocarbons (e.g. methane) in two main steps. The first step, which occurs in the first reactor 111 in this case uses a high-oxygen transfer catalyst, that converts with high selectivity light hydrocarbon gases and oxidizing agent such as $CO_2$ (Carbon Dioxide) into CO and $H_2$. This part of the process is known as dry reforming of methane (DRM). It's an endothermic process known for producing a $H_2/CO$ ratio more conducive to chain growth reactions of Fischer-Tropsch kind.

Importantly, the targeted global process turns these reactants into low formation energy products, solid carbon and liquid water, which both have a lower formation energy than the reactants.

The total global process becomes a slightly exothermic net reaction, which does not require an additional source of heat or work (in the thermodynamic sense) and consequently does not contribute to further $CO_2$ formation, as may be the case when electrochemistry (electrical work) is used to produce carbon products from $CO_2$. Energy is still required for the kinetic activation energy of the process, which consists in two sequential reactions.

$$CH_4+CO_2 \leftrightarrows 2CO+2H_2, \Delta H°_{298}=+247 \text{ kJ(Dry reforming of methane)} \quad (1):$$

$$2CO+2H_2 \leftrightarrows 2C+2H_2O, \Delta H°_{298}=-264 \text{ kJ} \quad (2):$$

$$CH_4+CO_2 \leftrightarrows 2C+2H_2O, \Delta H°_{298}=-17 \text{ kJ(NET reaction)} \quad (3):$$

As will be discussed further below, the Hz-CO blend produced in reaction the first reactor is flowed through a dispositive or device (monolith or corrugated substrate) containing nanoparticles of Fe, Ni, Mg, Cr, Cu, Zn, Mo, Co, and Mn and combinations thereof in the temperature range same or slightly below the temperature of the effluents of the dry reforming reactor. These nanoparticles catalyze the growth of carbon fibers from the Hz-CO mixture thus producing the solid CNF material.

It will be appreciated that, under industrial conditions, these reactions are mostly implemented irreversibly, therefore below only one single arrow going to the intended products is indicated. Nevertheless, aspects of this invention relate to how unreacted reactants can be reprocessed and recycled to improve efficiency.

The first reactor 111 is configured to perform the dry reforming of methane (DRM) shown in eq. (1) in which $CO_2$ and $CH_4$ are converted to syngas with $CO:H_2$ ratio close to 1. The $H_2:CO$ ratio may be configured to be at least 0.3 (e.g. at least 0.7 or 0.8). The $H_2:CO$ ratio may be configured to be at most 1.3 (e.g. at most 1.2 or 1.05) Changing the $H_2/CO$ ratio to high values may yield undesirable carbon type and mechanisms (Boudouard reaction is undesirable) moving it to low values may waste hydrogen.

High CO or lack of $H_2$ favours a high rate of C deposits via Boudouard reaction, and thus a lower selectivity. That is, the reaction is primarily to amorphous forms or, depending on T and residence time, to fibers and graphite. A high proportion of CO favours a process which is less selective to carbon nanofibres.

A high $H_2$ proportion yields slower carbonization and it typically favours graphitization and fiber production, particularly at high T (which is needed to accelerate the rate of reaction given the low partial pressure of CO). Furthermore, a low partial pressure of CO reduces mobility of adsorbed C (from decomposition of CO on the surface of the nano-particle) which reduces the rate of diffusion of C through the nano-particles, an important factor needed to build the nanofibers. Therefore graphene/graphite is the preferred product (rather than carbon nanofibres) with a higher proportion of $H_2$.

A quantification of purity for a primary production of CNFs is at this stage inexistent, or undefined yet, no standards available, which suggest the immaturity of the field as a science, in spite or precisely because the knowledge is kept industrially secret if it exist. We can only proceed by comparing how close our as produced CNFs are to the highest qualities.

In my views, we should induce in the patent judge acknowledgement of our higher understanding with respect to previous art, which leads us to higher quality of CNFs and to a better control of OUR PROCESS, something the previous patented processes don't reflect as we (can) do.

In the second reactor 112, the intermediate stream of syngas is converted to carbon fibers and steam.

The net reaction energy balance is slightly exothermic, thus resulting in energy production. This is a key factor in defining a potentially thermodynamically zero emission path for conversion of $CO_2$ and globally, as a reduced GHG activity that consumes $CO_2$ on a net basis. In addition, it allows heat from the exothermic reaction (2) to be harvested and used to control the endothermic reaction (1).

Reactions (1) and (2) are realized using stable catalysts that lower the reaction temperatures of the two reactions. Importantly, the use of the stable catalysts reduces the kinetic energy required for the reactions to take place.

The first reactor may comprise steam reforming (steam as the oxidizing agent reacting with light hydrocarbon), combination of dry and steam reforming (steam mixed with carbon dioxide reacting with light hydrocarbon), partial oxidation of methane (oxygen reacting with methane) or a combination of partial oxidation and reforming to generate $CO/H_2$ with an appropriate ratio.

The first catalyst may operate in a wide range of conditions including at low pressures from atmospheric to 3 MPa and in temperatures from 550 to 900° C.

Some examples of catalyst used in dry reforming of methane along with the conditions of the experiments are provided below:

| Catalyst | Operating condition | Reference |
|---|---|---|
| $La_{1-x}Ce_xNiO_3$ (x = 0, 0.05, 0.4, 0.7) | T = 550-750° C.<br>P = atmospheric<br>$CH_4:CO_2$ = 1:1<br>Space velocity = 72,000 $mlgr_{cat}^{-1}h^{-1}$ | Lima S M, Assaf J M, Peña M A, Fierro J L G. Structural features of La1−xCexNiO3 mixed oxides and performance for the dry reforming of methane. Applied Catalysis A: General 2006; 311: 94-104. |
| $Ce_{1-x-y}Zr_xM_yO_{2-\delta}$ (M = Rh, Ru) | T = 550-800° C.<br>P = atmospheric<br>$CH_4:CO_2$ = 1:1<br>Space velocity = 36,000 $mlgr_{cat}^{-1}h^{-1}$ | Pietraszek A, Koubaissy B, Roger A-C, Kiennemann A. The influence of the support modification over Ni-based catalysts for dry reforming of methane reaction. Catalysis Today 2011; 176(1): 267-271. |
| Ni—Ce/SBA-15 | T = 600° C.<br>P = atmospheric<br>$CH_4:CO_2$ = 1:1<br>Space velocity = 264,000 $mlgr_{cat}^{-1}h^{-1}$ | Kaydouh M-N, El Hassan N, Davidson A, Casale S, El Zakhem H, Massiani P. Effect of the order of Ni and Ce addition in SBA-15 on the activity in dry reforming of methane. Comptes Rendus Chimie 2015; 18(3): 293-301. |
| $Ni—Ce_{0.8}Zr_{0.2}O_2$ Promoted by MgO, CaO, and $La_2O_3$ | Space velocity = 480,000 h-1<br>T = 800° C.<br>P = atmospheric<br>$CH_4:CO_2$ = 1:1 | Jang W-J, Jeong D-W, Shim J-O, Kim H-M, Han W-B, Bae J W, Roh H-S. Metal oxide (MgO, CaO, and La2O3) promoted Ni—Ce0.8Zr0.2O2 catalysts for H2 and CO production from two major greenhouse gases. Renewable Energy 2015; 79: 91-95. |

The $H_2/CO/$ratio as well as other process and catalyst condition is adjusted to maximize decomposition of syngas to high purity carbon nanofibers and largely reduce the possibility of a Bosch reaction, a Boudouard reaction, and a methane reduction reaction as previous art teaches. The non-selective nature of these reactions will generally result in the formation of large combination of different allotropes of carbon solid products.

Catalyst I

For reaction (1) (e.g. dry reforming of methane (DRM)), many catalyst formulations are known in the art.

Previous heterogeneous catalysts are typically based on activity of noble and transition metals, particularly on Fe, Co, Ni, Ru, Rh, Pd, Ir, and Pt where noble elements offer high activity and coke resistivity but are unfavourable due to their high cost. First row transition metals such as Ni, Fe, and Co and combinations thereof may offer a more cost-efficient option.

Metal supported catalysts are the most developed type of catalyst for dry reforming of methane. The metals typically provide the active sites and may be selected from group VIII elements. The support is usually a metal oxide which serves as a carrying bed for sustaining the distributed active sites. In addition, it may provide sites for adsorption and dissociation of the reactants. Supports may be a combination of one or more of different metal oxides including, $Al_2O_3$, $SiO_2$, $ZrO_2$, MgO, $CeO_2$, $La_2O_3$, MnO, $BaTiO_3$ and $TiO_2$. Supports may also be in a form of solid solution such as $La_2Zr_2O_7$, $Ce_{1-x}Zr_xO_2$, etc.

The intermediate products from this step is syngas with a $H_2$:CO ratio close to one.

The first catalyst may be supported on a substrate which facilitates the bulk transport of oxygen. The first catalyst support may comprise a semiconductor. The first catalyst may comprise cerium. The first catalyst may comprise a rare-earth element. The first catalyst may comprise a lanthanide, scandium and/or yttrium.

Catalyst II

For Step 2 (i.e. reaction of carbon monoxide and hydrogen to form to carbon nanofibers (CNF)), the reaction is conducted using a supported catalyst. There are several important features about this catalyst:

Empty-core cylindrical shape of the support allows exposure of the gas to the catalyst for reaching to high load of CNF formation without plugging the reaction path.

Corrugated shape and oxide whiskers on the surface, makes the surface uneven allowing for high load of catalyst nanoparticles with very well distribution. Nanoparticles of transition metals have high tendency to migrate at high temperatures (60% of the Tammann temperature in Kelvin), forms necks with the neighbors, sinter and eventually form bigger particles. Providing a textured surface for nanoparticles may make it easier to control the distance of active nanoparticles and/or to control the diameter of carbon nanofibers.

The whiskers layer may be formed by directly on an appropriate metallic substrate. This may allow the support layer to be more malleable. It may also improve how heat can be conducted away from the whiskers.

Terracing or texturizing the substrate add an additional dimension to the substrate and facilitate to anchor the catalyst nanoparticles at the nano-metric level to the substrate site. Growing CNF on a flat surface or stainless steel wool may reduce the selectivity toward carbon nanofibers growth and result in a large variety of carbon forms including graphite, microfibers and amorphous carbon which are not as valuable as CNF.

The chemical bond between alumina and the catalyst nanoparticles modifies the reduction profile of the catalyst nanoparticles and retains the active site size in nano range.

The composition of the support is designed in a way that makes it magnetic and thus magnetic nanoparticles (catalyst precursor) during the deposition stage are attracted to the surface, this will lower the number of depositions required to reach to high load of catalyst on the support.

The catalyst nanoparticles (Fe doped with Ni and Mg) are magnetic which during the growth of CNF in a magnetic field will guide the CNF growth and align them.

It will be appreciated that some embodiments of the catalyst may have some or all of these features.

The support is made of iron alloy containing 5% Al by weight and the active catalyst is Fe, Ni, Mg, Mn, Co, Cr, W, Ti and Zn or combinations of them. In some embodiments, the support may contain less than 10% Al by weight.

Figure 4:
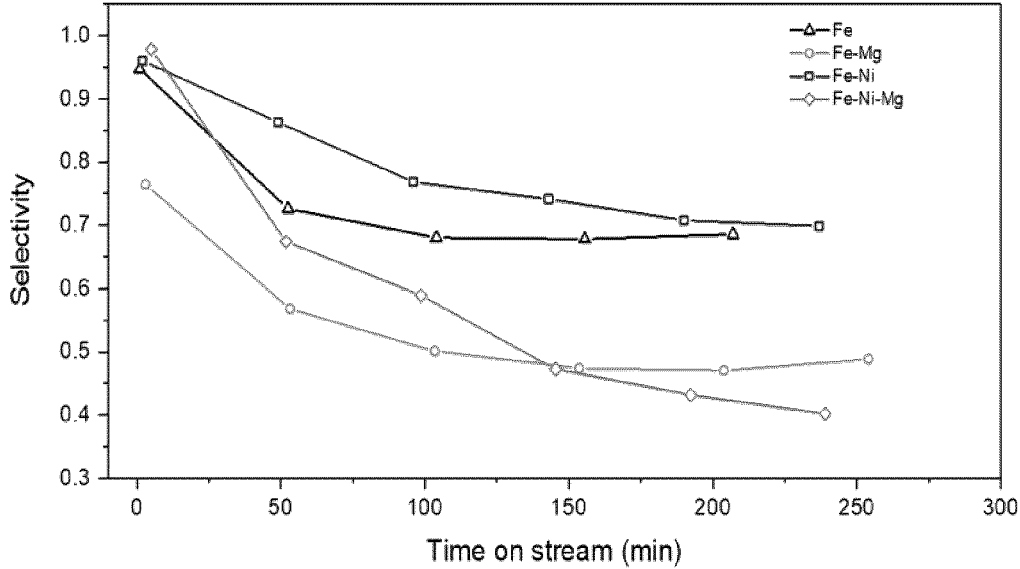
FIG. 4 is a graph of selectivity towards carbon nanofibers versus time on stream, comparison for four different catalysts.

FIG. 4 is a graph of selectivity towards carbon nanofibers versus time on stream, comparison for four different catalysts. The four catalysts consist of Fe and Fe doped with Ni, Mg, and both. The experiment was carried out at atmospheric pressure, 773 K, total flow: 100 ml·min-1, $H_2$:CO:Ar=0.4:0.4:0.2. The inert gas in this case is used as a standard for the gas analysis. In the industrial scale, $N_2$ may exist in the stream if a combustion stream (e.g. using air) is utilized as the source of $CO_2$.

The results for pure Fe catalyst are shown with triangles; the Fe—Mg catalyst results are shown with circles; the Fe—Ni catalyst results are shown with squares and the Fe—Ni—Mg catalyst results are shown with diamonds. As shown in FIG. 4, initially the Fe, Fe—Ni and Fe—Ni—Mg are the most selective. The Fe and Fe—Ni show less of a drop off in selectivity as time goes on. Selectivity is calculated as desired product (carbon) divided by total conversion. Higher selectivity means that the unwanted side reactions are occurring in marginal level.

In this embodiment, as shown in FIG. 2a, the support is corrugated and shaped in cylindrical form. This is then heat treated at temperature between 700-1000° C. for 5-48 hours to enable formation of $Al_2O_3$ whiskers on the surface and make the support surface uneven to maximize sustaining the catalyst particles on the support. FIG. 2b is an image of the substrate and $Al_2O_3$ whiskers. FIG. 2a is a schematic representation and FIG. 2b is SEM.

In addition, in this case, the support is coated with solution of catalyst precursors in which magnetic force and physical force enables adherence of the precursors to the support. The precursor is metal oxide based which undergo a heat treatment and/or reduction step and converts to metal-based catalyst either previous to CNF reaction or during the CNF reaction as the atmosphere is reducing.

In some embodiments, the catalyst precursor deposited on the support, heat treated and reduced with CO, $H_2$, or combinations of them diluted with an inert gas, Ar, He, and $N_2$ at a temperature between 500-800° C. for 2 to 48 hours.

Figure 3:
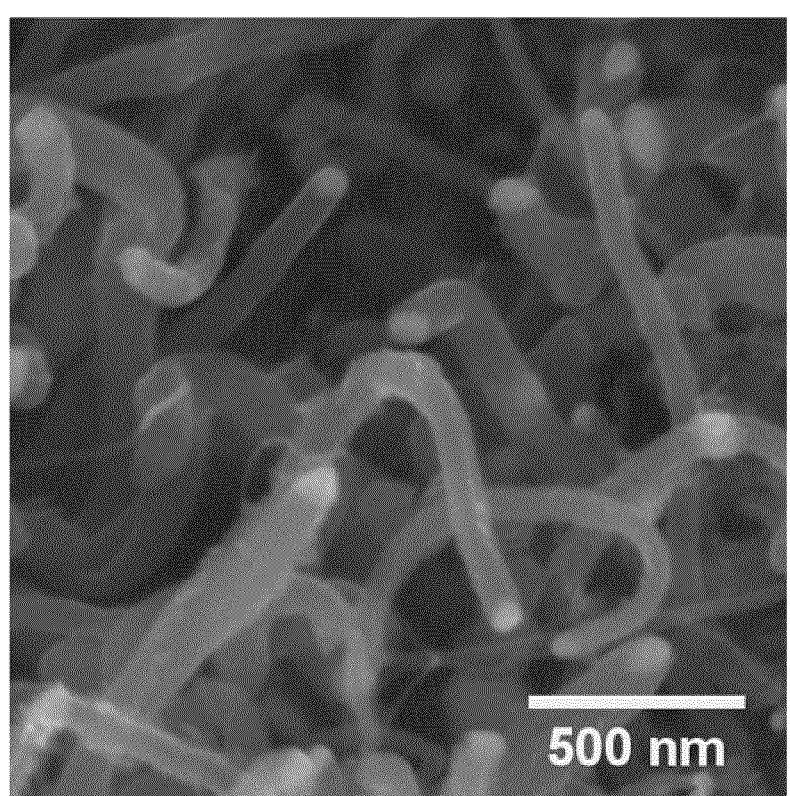
FIG. 3 is an SEM image of Carbon nanofibers grown on Fe—Ni catalyst, at 500° C.

In accordance with another aspect, the supported catalyst is designed in a way that carbon containing-gases (CO, $CO_2$ and light hydrocarbons from $C_1$ to $C_4$) can pass with ease through the reactor hot zone and supported catalyst during a significant period of time, until the structured element gets fully charged with CNF and can be harvested from the produced CNF material. FIG. 3 shows the structure of the CNFs produced.

In this case, to prepare this catalyst, a corrugated cylinder (see FIG. 2a) of FeCrAl alloy is produced. FeCrAl is an industrial alloy that can be conveniently shaped and corrugated to produce monoliths.

The corrugated shape is then subjected to a thermal treatment to generate alpha-alumina whiskers on the surfaces of the structured solid. Said filamentous alumina whiskers are the impregnated with nanoparticles of transition metal oxides made of Fe, Ni, Cu, Zn, Co, Mg, Mn and Mo, and combinations thereof and saturated with these nanoparticles via successive impregnation steps until reaching the desired composition and the number of catalytic nanoparticles that will drive the growth of CNF. The nanoparticles sit on the support and are physically attached to the uneven surface of the substrate.

The size of the particles of the catalyst precursor are kept below the size of the inter-whisker distance so that the precursors do not fill the volume between the whiskers. That is, the whiskers make the surface uneven, so if the size of the precursor goes such high that fills the valley completely then they are going to cover the surface and remove the uneven feature of the surface. This will put the active sites too close and make them to attach to each other during heat treatment and the catalyst will have low surface area. After heat treatment chemical bond forms between the catalyst and whiskers which strongly sustain the nanoparticles. The CNF are built by these catalytically active nanoparticles, which produce the fibers by staying at the tip of the growing fiber. That is, the CNF are fixed at one end to the support structure. At the free end of the CNF, there is typically a magnetic nanoparticle. The structure of the CNFs is shown in the SEM image in FIG. 3.

Because many of the CNF have magnetic nanoparticles at the free end, a magnetic field can be used to control the azimuthal orientation. In this case, the magnetic field is generated by a magnetic rod and is used to align the CNF growth in one approximate direction. It will be appreciated that the magnetic field may be provided and controlled by using permanent magnets and/or electromagnets.

The fibers typically grow with one initial end attached to the alumina whiskers. Once the monolith is saturated with CNFs, these are detached from it via the introduction of a mechanical tool that will cut the fibers close to their root attached to the alumina, this way the monolith can be re-impregnated and re-used. Other mechanical devices, tool shapes and fibers detaching technique can be used for extracting the fibers from the monoliths. In addition, the CNFs may be removed by applying a time-dependent magnetic field which causes detachment by moving the CNFs back and forth.

The CNF diameter may be between 10 nm to 200 nm, the length may be from 1 μm to a few cm. CNF with solid core is composed of graphene layer that they may be aligned parallel, perpendicular or with an angle to the fiber axis. Empty core fibers that are alternatively called carbon nanotubes are made of 1 or several coaxially rolled graphene layer. After harvesting, the substrate may need to be loaded with catalyst nanoparticles again.

The operation can be automatically performed so the second reactor is in fact a group of alternating cartridges that will have some of them performing the CNF growth, while others are been submitted to the CNF harvesting and re-initiation by cutting out the fibers and re-impregnating and activating the monoliths to get back into CNF growth. The catalysts impregnated onto the monoliths of this second reactor apparatus allow the production of carbon nanofibers of high quality already at temperatures in the range 400-690° C., more preferably in the range 450-680° C. and in the same pressure range of the reactor 1, which makes the whole process of low integration cost.

Figure 5A:
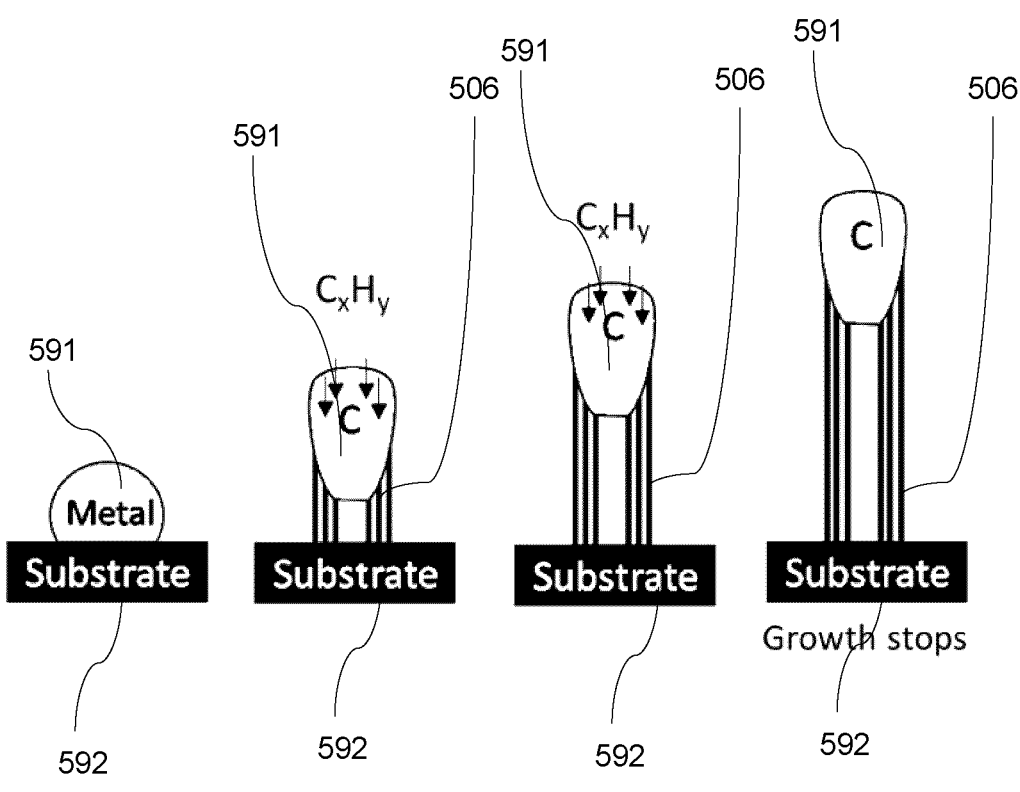
FIGS. 5a and 5b show two possible mechanistic steps of CNF production in accordance with the present disclosure.
Figure 5B:
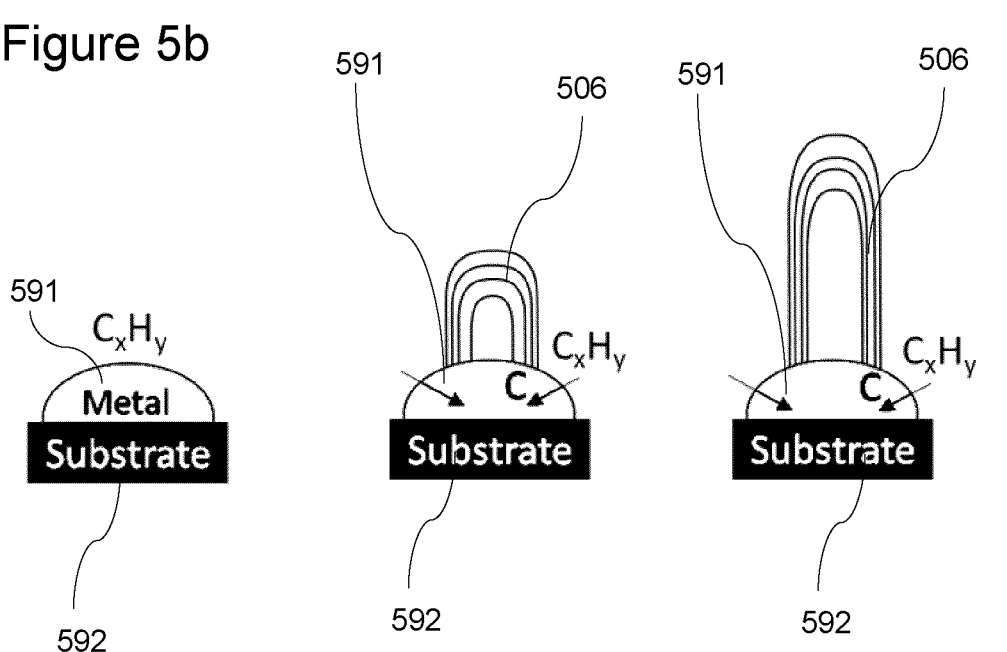

FIGS. 5a and 5b show two possible mechanistic steps of CNF production. In FIG. 5a the active site of the catalyst 591 moves to the tip of CNF 406 as the CNF grows on the support 592. In FIG. 5b, the active site of the catalyst 591 stays on the support 592. FIGS. 5a and 5b are adapted from Kumar M, Ando Y. "Chemical Vapor Deposition of Carbon Nanotubes: A Review on Growth Mechanism and Mass Production", J. Nanosci. Nanotechnol., 2010; 10, 3739-3758.

Figure 6A:
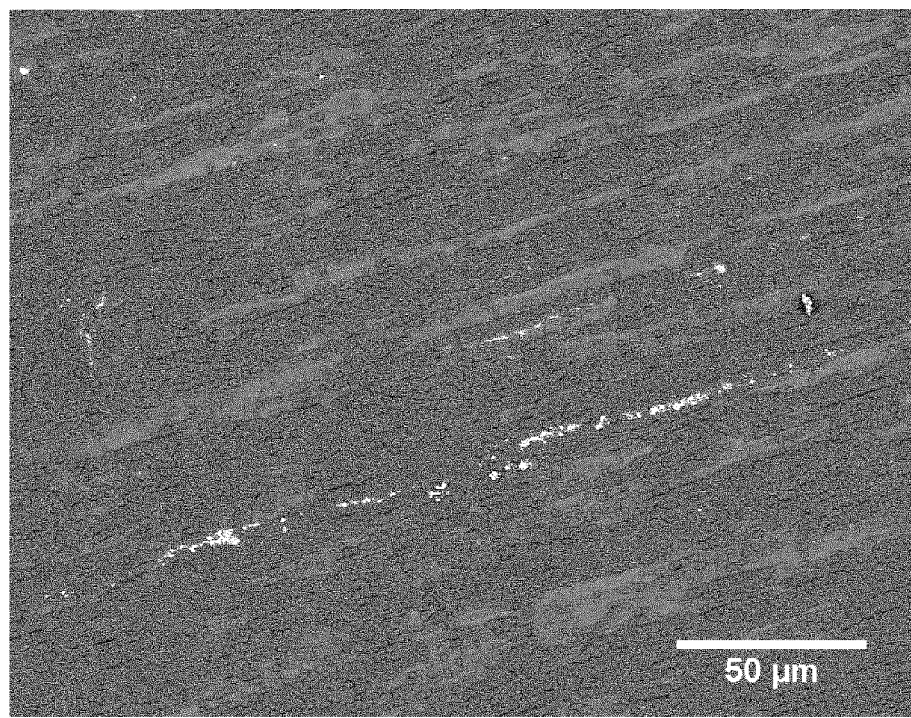
FIGS. 6a-c show an alumina support surface for supporting the second catalyst in accordance with the present disclosure at three different magnifications.
Figure 6B:
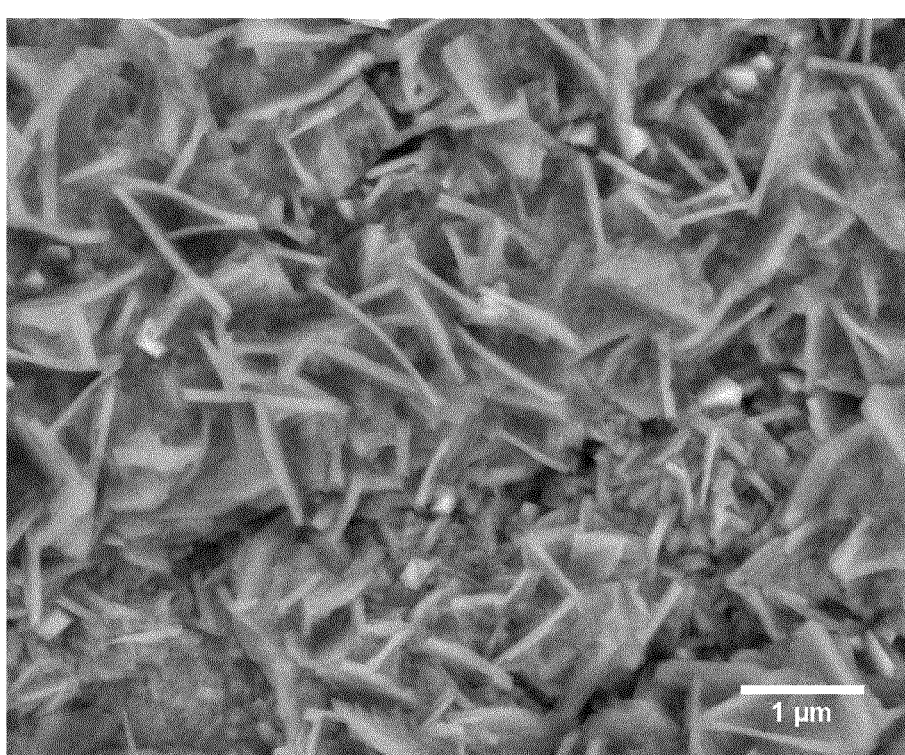
Figure 6C:
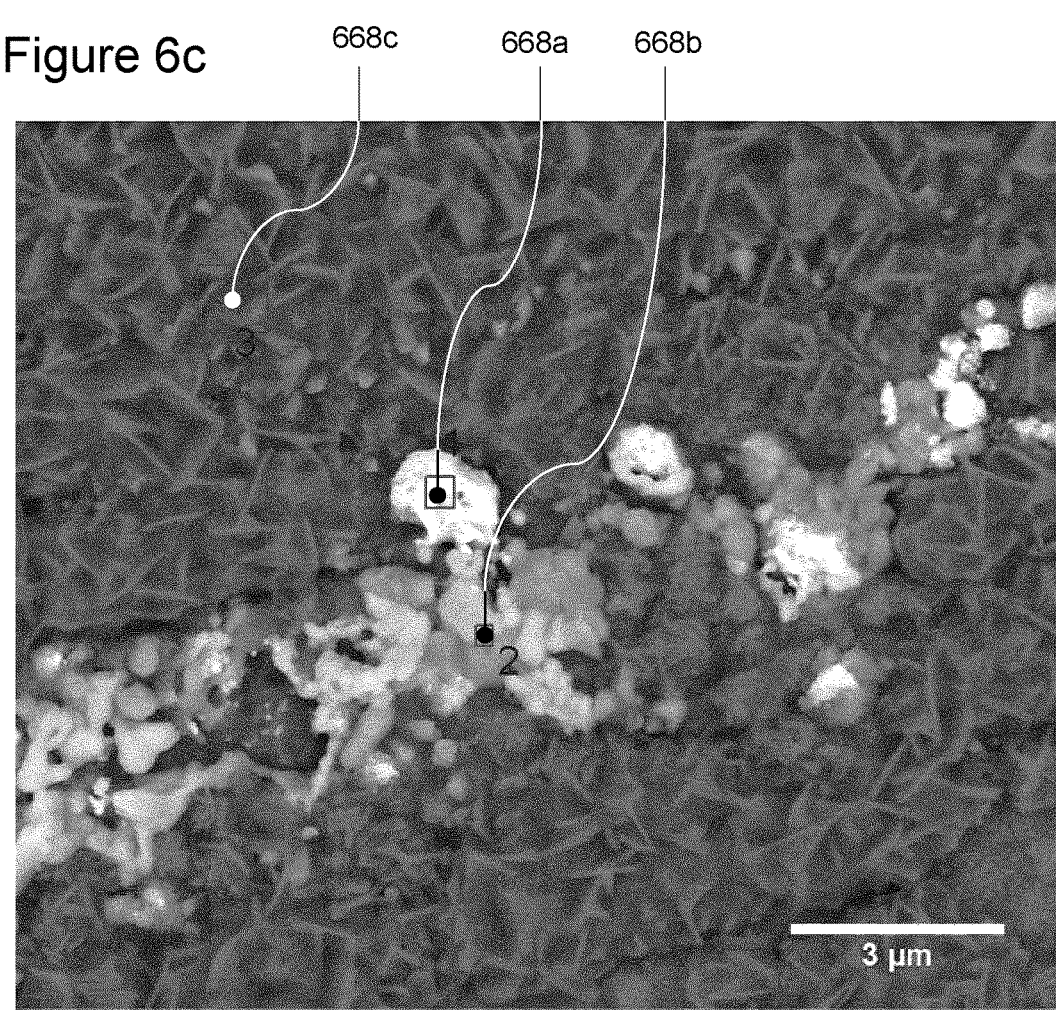

FIG. 6a-6c show an alumina support surface for supporting the second catalyst in accordance with the present disclosure at three difference magnifications.

Figure 7A:
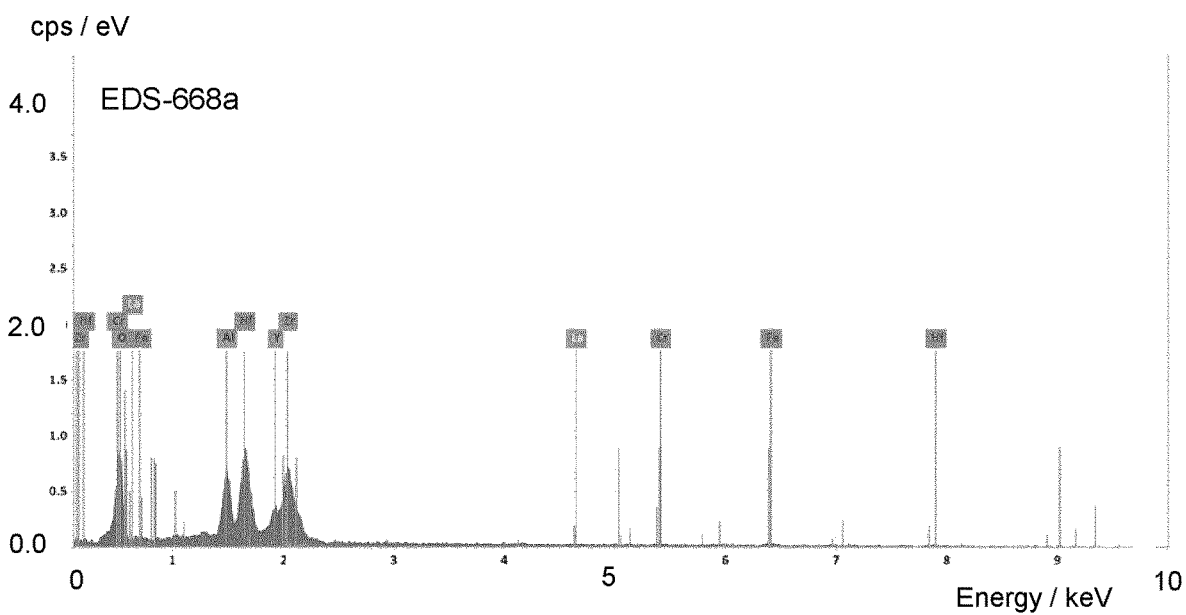
FIGS. 7a-c are graphs of the chemical analysis of the support surface of FIG. 6c at three different locations.
Figure 7B:
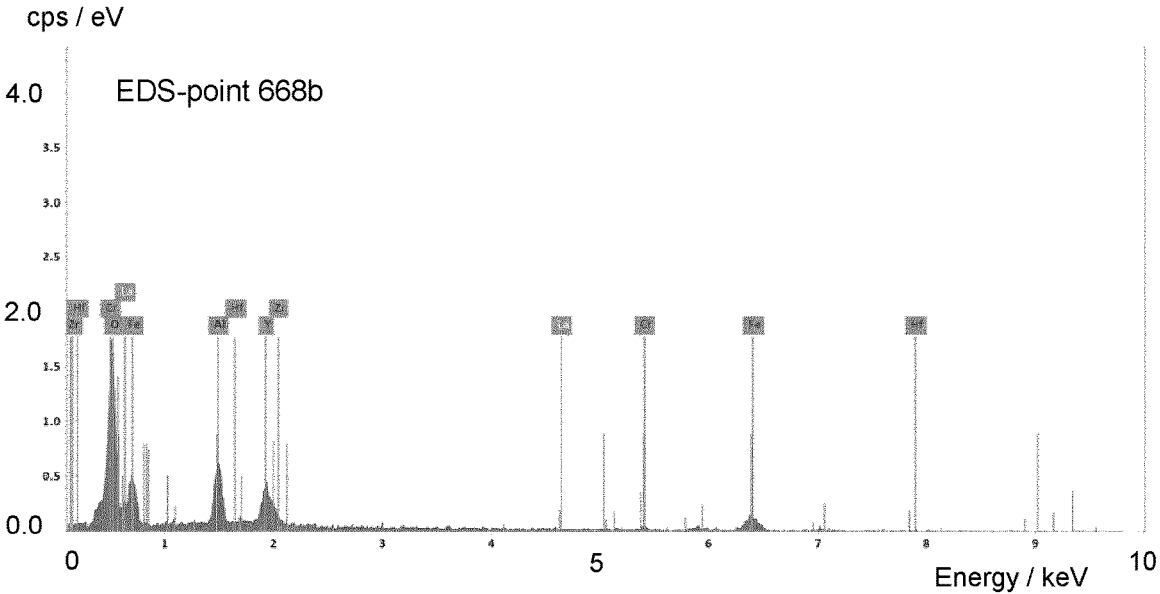
Figure 7C:
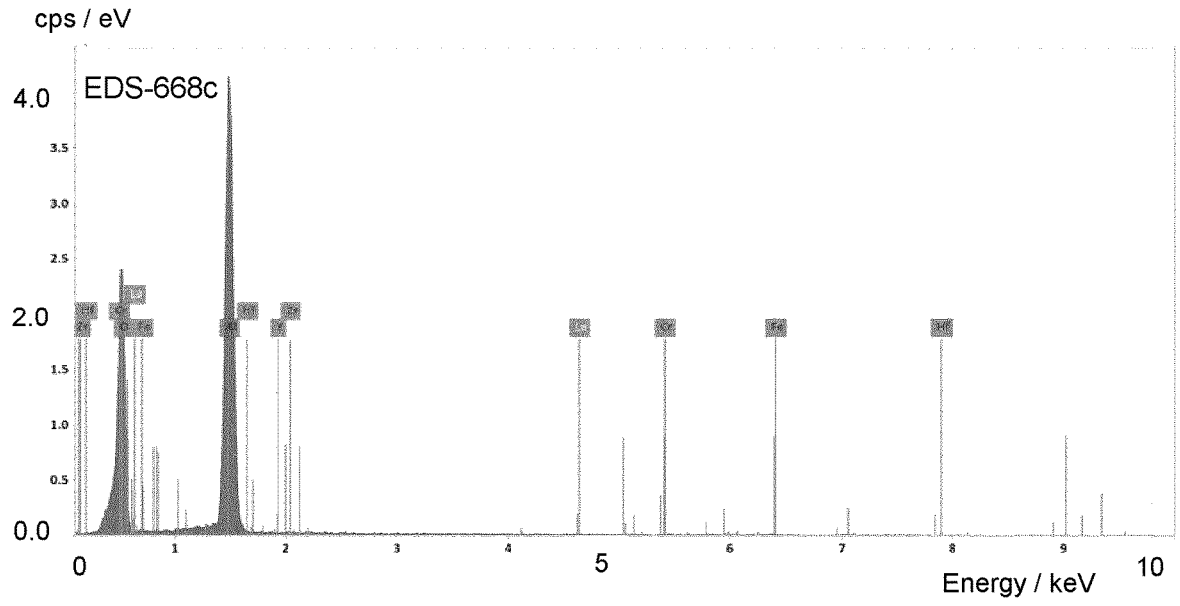

FIGS. 7a-c are graphs of the energy-dispersive X-ray spectroscopy chemical analysis of the support surface of FIG. 6c at three different locations 668a-c. Energy-dispersive X-ray spectroscopy (EDS) analysis were conducted on 3 points, 668 a, 668 b and 668 c show the chemical composition of the oxide coating formed on Fe based substrate. Depending on the location that the analysis was performed, the chemical composition may slightly vary. The oxide layer contains Al, Y, Zr, Cr, and Hf. In 668a, b, and c the concentrations of elements are different.

FIGS. 8a to 8e shows different microstructure, morphologies and size of carbon nanofibers grown on Fe based catalyst during different sets of experiments, showing abundance of elongated carbon nanofibers.

Figure 8A:
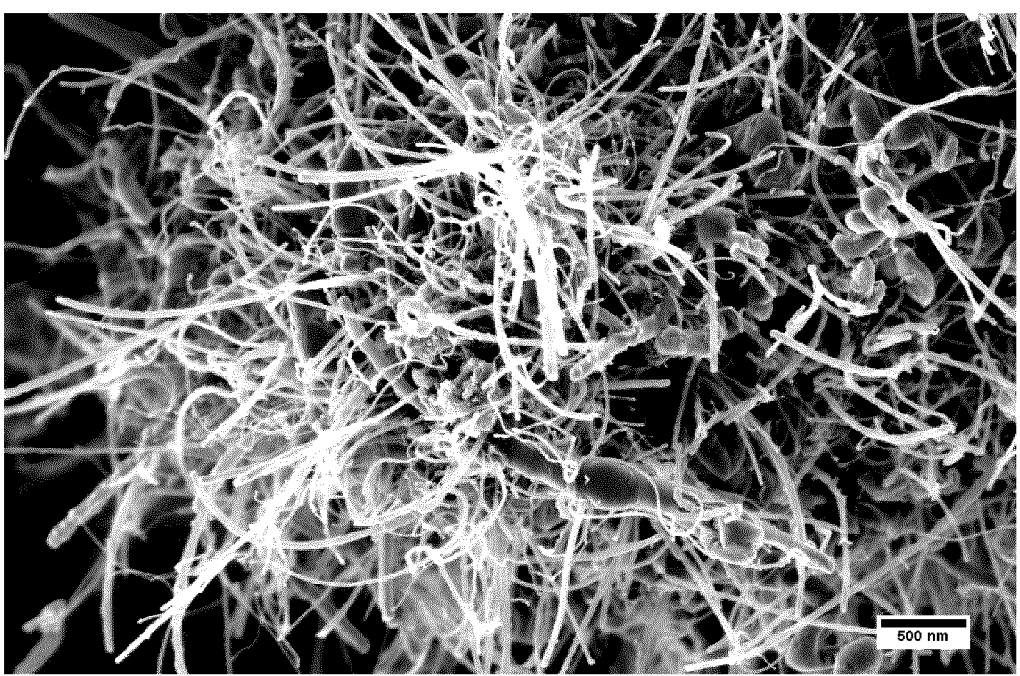
FIG. 8 a-e are SEM images of Carbon nanofibers grown on Fe based catalysts in different set of experiments, showing different morphologies of synthesized carbon nanofibers.
Figure 8B:
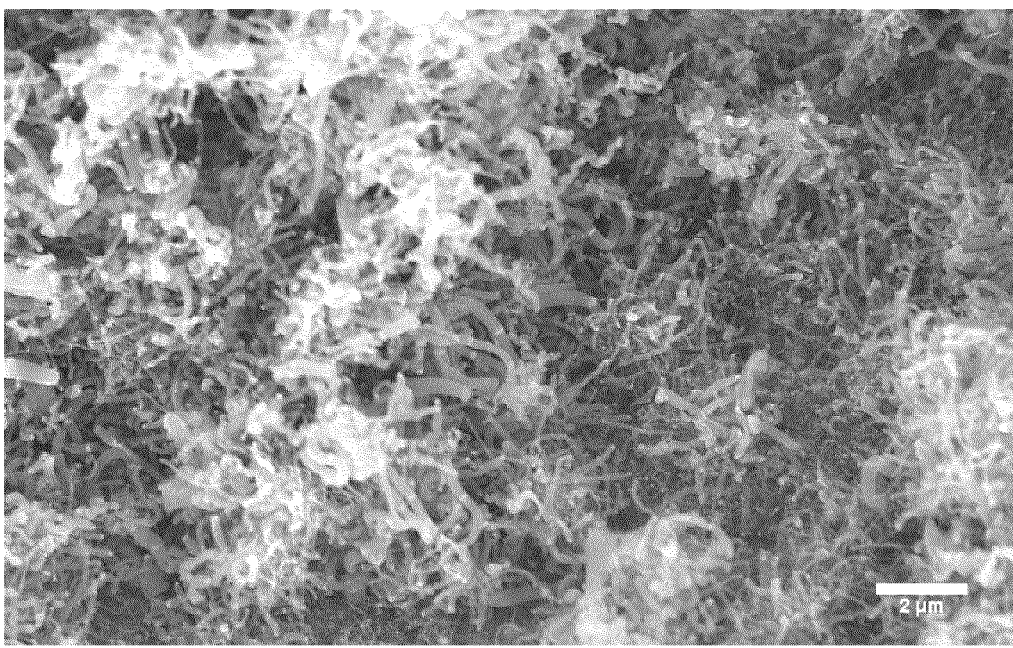
Figure 8C:
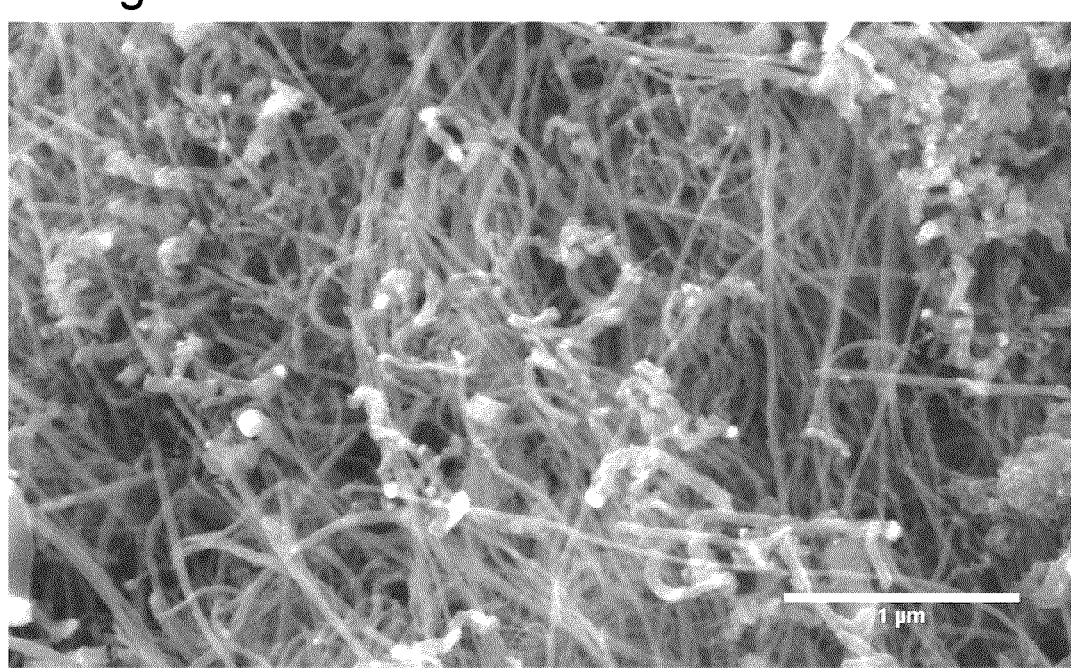
Figure 8D:
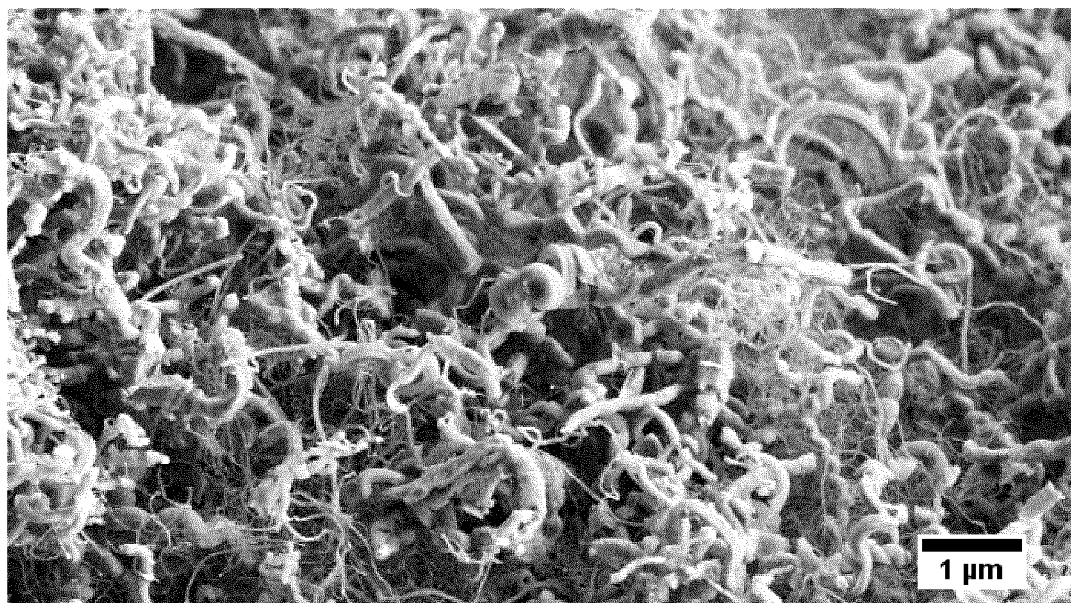
Figures 8E, 9:
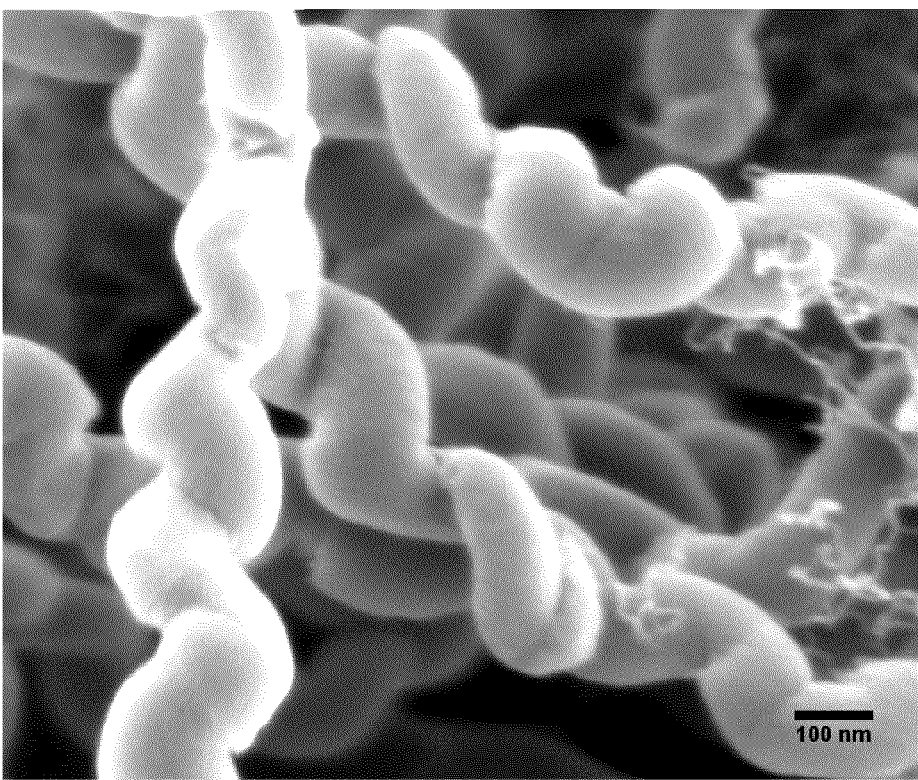
FIG. 9 is a table showing the chemical composition of carbon nanofibers produced according to the present process.

FIG. 9 shows the chemical composition of carbon nanofibers produced according to the present process.

Figure 10:
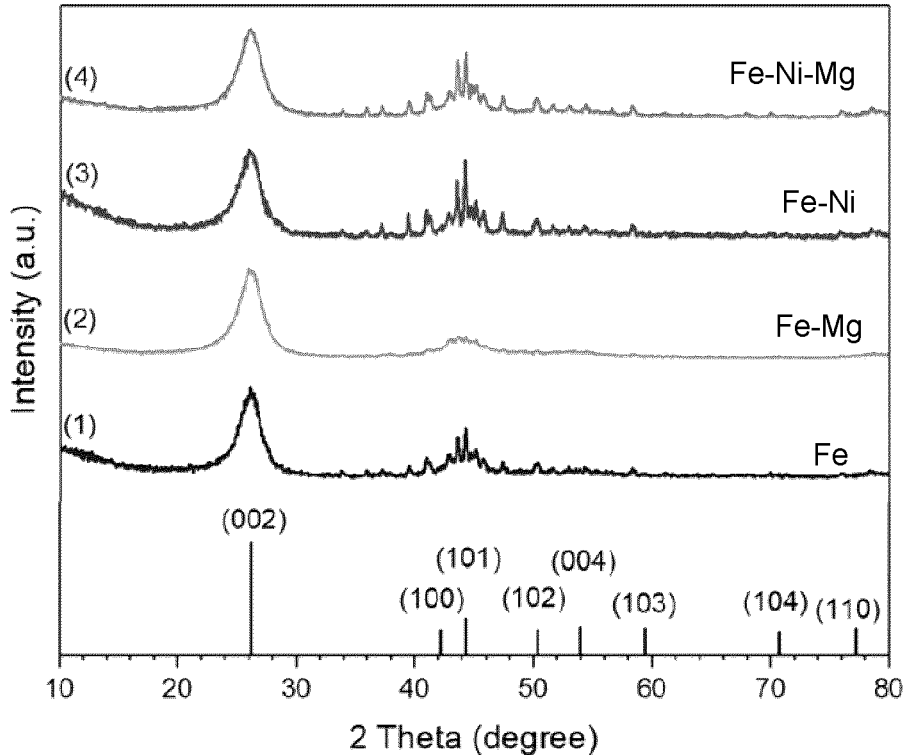
FIG. 10 are powder XRD patterns of carbon formed by catalytic reaction of $CO/H_2=1$ mixture at 500° C. on different nPs loaded on a substrate compared with graphite, (inorganic crystal structure database (ICSD) card no. 1011060, space group P63mc).

FIG. 10 shows powder XRD diffraction of carbon nanofibers produced from the procedure disclosed herein, proving high degree of crystallinity and lack of disordered carbon products.

Figure 11A:
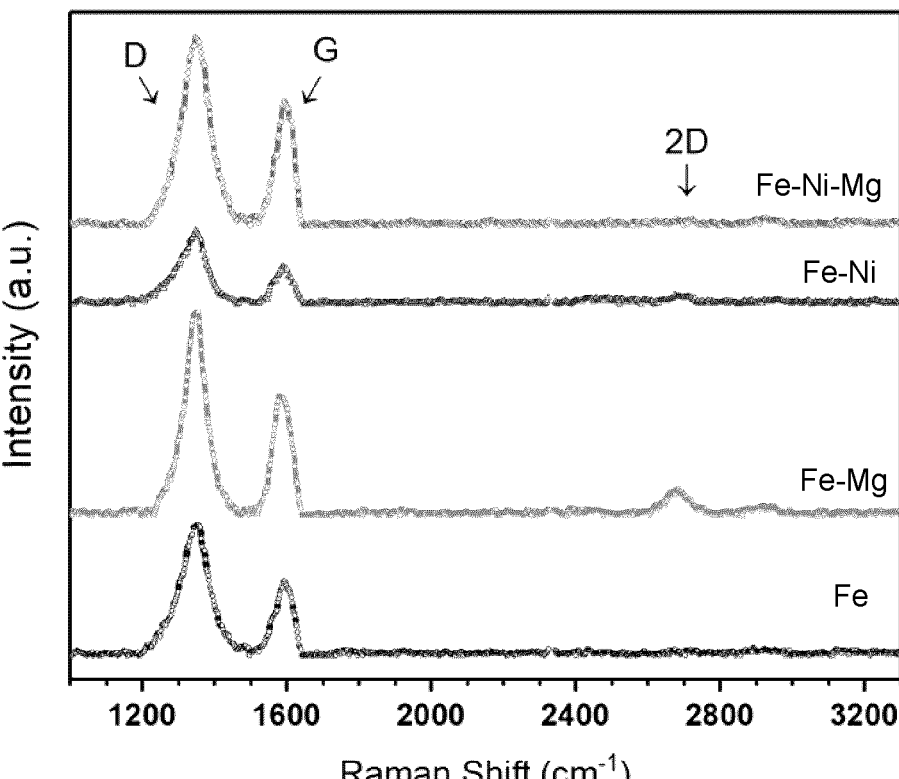
FIG. 11a is a Raman analysis of carbon nanofibers from this proposed process.

FIG. 11a shows Raman analysis and high intensity of Id (D band) over Ig (G band) of CNF produced from the procedure disclosed herein. FIG. 11b shows comparison between Id/Ig of CNF produced from this procedure and CNF commercially available reported in reference 4.

Variations and Other Applications

The catalytic process described herein can be used in a variety of applications involving $CO_2$ production from methane or other light hydrocarbons.

For example, in steam reforming processes, methane is available as a reactant and $CO_2$ is a co-product along with the hydrogen to be produced as the main industrial interest, following the reaction:

$$CH_4 + 2 H_2O \rightarrow CO_2 + 4 H_2 \qquad (4)$$

Accordingly, CNF production utilizing reaction (3)

$$CH_4 + CO_2 \rightarrow 2C + 2H_2O \qquad (3)$$

The industrial methane steam reforming process would result in the environmentally innocuous global process:

$$2 CH_4 \rightarrow 4 H_2 + 2C, \qquad (5)$$

While the C produced is a high-quality valuable product.

This net result means that by incorporating the subject catalytic process, the activity of generating industrial hydrogen has the potential of making it zero $CO_2$ emissions, or at least capable of reducing it proportionally to the CNF material that could be produced.

It also reduces water consumption as the water consumed in eq. (4) is matched by the one produced in equation (3). The total process making CNFs considered as produced from $CH_4$.

In addition, the processes can be done in refineries, a major $CO_2$ producer. As is known, within refineries hydrogen is produced via steam reforming as well as via fluid catalytic cracking process (FCC) which is a principal source of synthetic gasoline.

Fluid catalytic cracking (FCC) burns to generate $CO_2$, around 4 to 8% of the mass of gasoline produced in the world. Most refineries have availability of methane as fuel, and produce, or may produce, or may deviate quantities of light alkanes to reduce $CO_2$ emission through the process disclosed herein. It will be appreciated that other industries generating $CO_2$ in elevated quantities could use this process to produce a useful material, provided that $CH_4$ and/or other light hydrocarbons were available that could be activated to produce the adequate composition of $CO:H_2=1:1$.

For instance, using light alkanes the process would become $$C_nH_{2n+2} + (n+1)/2 \ CO_2 \rightarrow (3n+1)/2C + (n+1)H_2O \qquad (6)$$

With the dry reforming step requiring slightly less energy to activate catalytically the hydrocarbons via:

$$C_nH_{2n+2} + n \ CO_2 \rightarrow 2n \ CO + (n+1)H_2 \qquad (7)$$

The process is therefore usable for any source of $CO_2$ provided there is available a light hydrocarbon stream that could make the synthesis gas available with the adequate low proportion of $H_2$ to CO.

An excess of hydrogen during the CNF formation may affect the process by reconstituting methane or making it less dissociated (Le Châteliers principle) which would make the process require higher temperature conditions. Therefore, it is preferable to maintain at or close to the stoichiometric 1:1 ratio for $H_2$:CO, which gives value to the preferred path of dry reforming. Only the methane reforming reaction produces such low hydrogen proportion syngas. In other embodiments with other alkanes, the excess hydrogen may be removed or used as an energy source for the process.

An excess of CO would yield lower amounts of water, making ordinary fibers or non-filamentous carbon, increasing the undesirable Boudouard reaction to prevail, which produces an amorphous carbon by the reaction: $2 CO \rightarrow CO_2 + C$.

The present process, which uses the reaction: $CO + H_2 \leftrightarrows C + H_2O$, may be energetically more efficient than the Boudouard reaction. It may also eliminate the costly separation of hydrogen and securing a path for the exclusive production of carbon nanofibers as the Boudouard reaction is less selective in the quality of the carbon materials produced. In addition, the present process allows overall utilization of $CO_2$ instead of re-producing $CO_2$ through Boudouard reaction. It may also use catalysts that allow moderate process conditions for CNF production.

Although the present invention has been described and illustrated with respect to preferred embodiments and preferred uses thereof, it is not to be so limited since modifications and changes can be made therein which are within the full, intended scope of the invention as understood by those skilled in the art.

BIBLIOGRAPHY

The following documents were referenced above:
1. Park, C., Rodriquez, N. M., and Baker, R. T. K., "Carbon Deposition on Iron-Nickel during Interaction with Carbon Monoxide-Hydrogen Mixtures", Journal of Catalysis 169, 212-227 (1997).
2. Nikolaev, P. et al., "Gas-phase catalytic growth of single-walled carbon nanotubes from carbon monoxide", Chemical Physics Letters 313, 91-97 (1999).
3. Walker Jr, P. L., Rakszawski, J. F., and Imperial, G. R., "Carbon Formation from Carbon Nonoxide-Hydrogen Mixtures over Iron Catalysts. I. Properties of Carbon Formed", J. Phys. Chem., 63, 2, 133-140 (1959).
4. Tessonnier, J-P. et al., "Analysis of the structure and chemical properties of some commercial carbon nanostructures", Carbon, 47, 1779-1798 (2009).

The invention claimed is:

1. A process for producing carbon nanofibers, the process comprising:
   in a first reactor, reacting a light hydrocarbon stream with an oxidizing agent to perform a reforming reaction to produce an intermediate gas stream comprising hydrogen and carbon monoxide; and
   in a second reactor, converting, using a nanoparticle catalyst consisting of nanoparticles, the produced hydrogen and the produced carbon monoxide selectively to carbon nanofibers that build up inside the second reactor, and steam which exits the second reactor,
   wherein the nanoparticles are formed on a support comprising barriers of filamentous oxide whiskers configured to restrict motion of the nanoparticles across a surface of the support and,
   wherein the nanoparticles are chemically bonded to the support.

2. The process of claim 1, further comprising: separating, using a separator, unreacted portions of the $CO_2$ and the light hydrocarbon from the intermediate gas stream; and recycling the separated unreacted portions of $CO_2$ and the light hydrocarbon into the first reactor.

3. The process of claim 2, wherein the step of separating unreacted portions of the $CO_2$ and the light hydrocarbon from the intermediate gas stream from the first reactor is carried out using a membrane separator.

4. The process according to claim 1, wherein the first reactor is configured to enable dry catalytic reforming of the light hydrocarbon.

5. The process according to claim 1, wherein the reforming reaction in the first reactor is carried out at a temperature between about 480° C. and about 850° C., and at a pressure up to about 5 MPa.

6. The process according to claim 1, wherein the light hydrocarbon is methane.

7. The process according to claim 1, wherein the process comprises harvesting heat from the second reactor and supplying the harvested heat to the first reactor.

8. The process according to claim 1, wherein the unreacted portions of the oxidising agent and the light hydrocarbon are passed through the second reactor along with the produced hydrogen and the carbon monoxide.

9. The process according to claim 1, wherein the nanoparticles comprise one or more of Fe, Ni, Cu, Zn, Co, Mg, Mn and Mo.

10. The process according to claim 1, wherein a diameter of the nanoparticles is between 30-150 nm.

11. The process according to claim 1, wherein the reaction in the first reactor is configured to provide the hydrogen and the carbon monoxide in a molar ratio of between 0.5 and 1.2.

12. The process of claim 1, wherein the support is magnetic.

13. The process of claim 1, wherein the filamentous oxide whiskers comprise alumina.

14. The process of claim 1, wherein the filamentous oxide whiskers comprise zirconia.

15. A process for producing carbon nanofibers, the process comprising:
   in a first reactor, reacting a light hydrocarbon stream with an oxidizing agent to perform a reforming reaction to produce an intermediate gas stream comprising hydrogen and carbon monoxide; and
   in a second reactor, converting, using a nanoparticle catalyst consisting of nanoparticles, the produced hydrogen and the produced carbon monoxide selectively to carbon nanofibers that build up inside the subsequent second reactor, and steam which exits the subsequent second reactor,
   wherein the nanoparticles are formed on a support comprising barriers of filamentous oxide whiskers configured to restrict motion of the nanoparticles across a surface of the support, and
   wherein the support is magnetic.

16. The process of claim 15, further comprising: separating, using a separator, unreacted portions of the $CO_2$ and the light hydrocarbon from the intermediate gas stream; and recycling the separated unreacted portions of $CO_2$ and the light hydrocarbon into the first reactor.

17. The process according to claim 15, wherein the first reactor is configured to enable dry catalytic reforming of the light hydrocarbon.

18. The process according to claim 15, wherein the reforming reaction in the first reactor is carried out at a temperature between about 480° C. and about 850° C., and at a pressure up to about 5 MPa.

19. The process according to claim 15, wherein the light hydrocarbon is methane.

20. The process according to claim 15, wherein the nanoparticles comprise one or more of: Fe, Ni, Cu, Zn, Co, Mg, Mn and Mo.

21. The process according to claim 15, wherein a diameter of the nanoparticles is between 30-150 nm.

22. The process according to claim 15, wherein the reaction in the first reactor is configured to provide the hydrogen and the carbon monoxide in a molar ratio of between 0.5 and 1.2.

23. The process of claim 15, wherein the filamentous oxide whiskers comprise alumina.

24. The process of claim 15, wherein the filamentous oxide whiskers comprise zirconia.

* * * * *